(12) United States Patent
Xu

(10) Patent No.: US 12,438,467 B2
(45) Date of Patent: Oct. 7, 2025

(54) CIRCUIT, FAN SYSTEM, AND TRANSFORMER FOR POWER CONVERSION

(71) Applicant: Infineon Technologies Austria AG, Villach (AT)

(72) Inventor: Kuiwei Xu, Xi'an (CN)

(73) Assignee: Infineon Technologies Austria AG, Villach (AT)

( * ) Notice: Subject to any disclaimer, the term of this patent is extended or adjusted under 35 U.S.C. 154(b) by 116 days.

(21) Appl. No.: 18/390,908

(22) Filed: Dec. 20, 2023

(65) Prior Publication Data
US 2024/0223088 A1    Jul. 4, 2024

(30) Foreign Application Priority Data

Dec. 30, 2022    (CN) .......................... 202211727112.8

(51) Int. Cl.
  *H02M 3/335*    (2006.01)
  *A61L 9/22*    (2006.01)
  *H01J 37/32*    (2006.01)

(52) U.S. Cl.
  CPC ............... *H02M 3/335* (2013.01); *A61L 9/22* (2013.01); *H01J 37/32844* (2013.01)

(58) Field of Classification Search
  None
  See application file for complete search history.

(56) References Cited

U.S. PATENT DOCUMENTS

| | | | |
|---|---|---|---|
| 2002/0017893 A1* | 2/2002 | Duff, Jr. .................. | H02H 7/16 320/100 |
| 2009/0028593 A1* | 1/2009 | Okumura ........... | G03G 15/5004 399/55 |

* cited by examiner

*Primary Examiner* — Crystal L Hammond
(74) *Attorney, Agent, or Firm* — Harrity & Harrity, LLP

(57) ABSTRACT

Disclosed are a circuit, a fan system, and a transformer for power conversion. The circuit for power conversion includes: a voltage input terminal including a positive input terminal and a negative input terminal; a transformer, a first end of the primary side of the transformer being coupled to the positive input terminal and a second end thereof being coupled to the negative input terminal; a switch, a first end of which being coupled to the negative input terminal and a second end of which being coupled to the second end of the primary side; a first output terminal; and a secondary-side rectifier module coupled between the secondary side of the transformer and the first output terminal, for outputting, at the first output terminal, an output signal with superimposed direct current and alternating current.

23 Claims, 14 Drawing Sheets

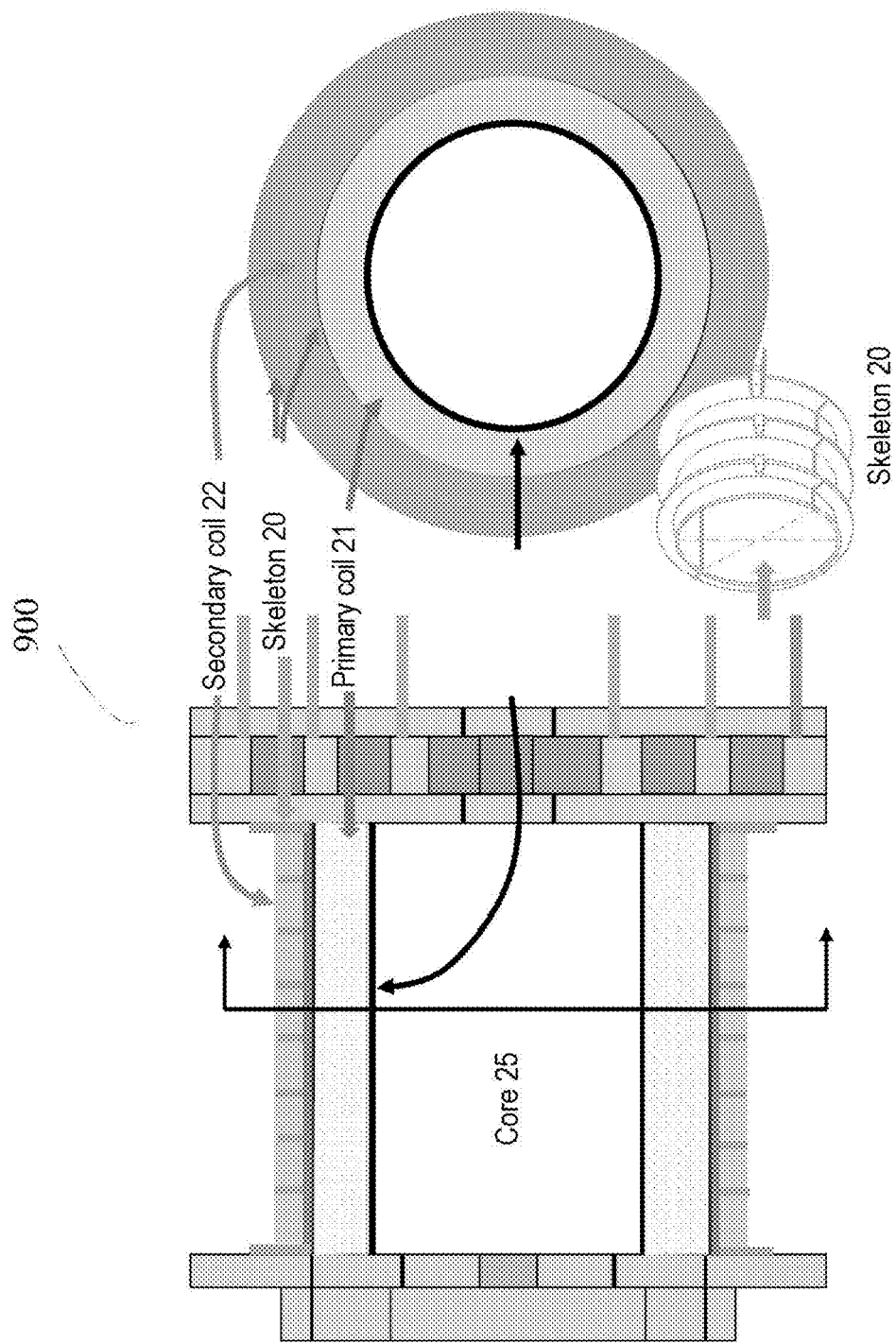

CIRCUIT, FAN SYSTEM, AND TRANSFORMER FOR POWER CONVERSION

CROSS-REFERENCE TO RELATED APPLICATION

This application claims priority to China Patent Application No. 102022129102.2 filed on Dec. 30, 2022, the content of which is incorporated by reference herein in its entirety.

TECHNICAL FIELD

The present disclosure relates to the field of electronic circuits and specifically relates to power conversion.

BACKGROUND

High-voltage direct current (HV DC) fans have been developed and used for driving aircrafts. With such an HV DC fan, air is ionized by high-voltage electricity, and then ionized air is accelerated by a strong electric field to generate ionized wind, providing the thrust required for an aircraft to fly.

However, due to radiation and the presence of ozone, HV DC fans are yet to be made suitable for use in homes or other civilian scenarios.

SUMMARY

The present disclosure will be summarized below to provide a basic understanding of certain aspects of the present disclosure. It should be understood that the summary is by no means an exhaustive summary of the present disclosure. It is not intended to identify key or essential parts of the present disclosure or to limit the scope of the present disclosure. Its sole purpose is to explain some concepts in a simplified form as an introduction to a more detailed description provided later.

According to one aspect of the present disclosure, a circuit for power conversion is provided, including: a voltage input terminal, which includes a positive input terminal and a negative input terminal; a transformer, wherein a first end of the primary side of the transformer is coupled to the positive input terminal and a second end thereof is coupled to the negative input terminal; a switch, a first end of which is coupled to the negative input terminal and a second end of which is coupled to the second end of the primary side; a first output terminal; and a secondary-side rectifier module coupled between the secondary side of the transformer and the first output terminal, for outputting, at the first output terminal, an output signal with superimposed direct current and alternating current (AC).

Preferably, the secondary-side rectifier module includes a voltage-doubling rectifier circuit composed of a plurality of diodes and a plurality of capacitors for generating output signals.

Preferably, the plurality of capacitors and the plurality of diodes are alternately connected in series to one another, and adjacent diodes are coupled between the two ends of the secondary side in a polarity reversal manner.

Preferably, a first end of a first diode among the plurality of diodes is coupled to one end of the secondary side through a first capacitor among the plurality of capacitors, and a second end of the last diode is coupled to the first output terminal.

Preferably, a second end of the first diode is coupled to a third output terminal.

Preferably, the circuit for power conversion further includes an additional capacitor, one end of which is coupled to the positive input terminal or the negative input terminal, and the other end of which is coupled to a second end of the first diode.

Preferably, the circuit used for power conversion further includes a current detection module coupled between a second end of the first diode and ground or between a second end of the first diode and the output terminal of the voltage-doubling rectifier circuit.

Preferably, the circuit used for power conversion further includes a voltage feedback module coupled between a first end of the last diode and ground.

Preferably, the switch is a silicon carbide metal-oxide-silicon field-effect transistor, and the circuit for power conversion further includes an additional diode, the anode of which is coupled to a second end of the primary side and the cathode of which is coupled to the drain of the silicon carbide metal-oxide-silicon field-effect transistor.

Preferably, the circuit for power conversion further includes an RCD absorption circuit (e.g., a resistor-capacitor-diode (RCD) absorption circuit) on the primary side.

Preferably, the voltage-doubling rectifier circuit further includes a plurality of inductors, each of which are coupled between the corresponding capacitors and diodes in the voltage-doubling rectifier circuit by being spaced or arranged with a group of capacitors and diodes.

Preferably, a first end of a diode (e.g., each diode) is an anode and a second end thereof (e.g., of each diode) is a cathode, and the circuit for power conversion outputs, at the first output terminal, an output signal with superimposed negative direct current and alternating current.

Preferably, a first end of a diode (e.g., of each diode) is a cathode and a second end thereof (e.g., of each diode) is an anode, and the circuit for power conversion outputs, at the first output terminal, an output signal with superimposed positive direct current and alternating current.

Preferably, the direct current has a voltage greater than 1000 volts, and the alternating current has a frequency greater than 10 KHz.

Preferably, the circuit for power conversion further includes a second output terminal coupled to a first end of the last diode, wherein the secondary-side rectifier module outputs, at the second output terminal, another output signal consisting only of the direct current among the direct current and alternating current output from the first output terminal.

According to another aspect of the present disclosure, a fan system is provided, including: a gas inlet portion configured to introduce external gas; a plasma generation device configured to generate plasma and an electric field for driving plasma to make directional movement, such that the gas introduced from the gas inlet portion makes directional movement following the plasma, wherein the plasma generation device is driven by a circuit for power conversion according to the present disclosure, or receives an output signal with superimposed direct current and alternating current output by the circuit for power conversion according to the present disclosure; and a gas purifying unit configured to purify the gas passing through the plasma generation device to reduce the concentration of ozone ions in the gas.

Preferably, the gas purifying unit has a metal or ceramic surface and includes a catalyst for purifying gas. Preferably, the catalyst is a catalyst for eliminating ozone.

According to yet another aspect of the present disclosure, a transformer is provided, including a core; a primary coil wound around the core; an electrical insulating skeleton provided with a plurality of grooves in a direction perpendicular to the axis of the core; and secondary coils sequentially wound in series in each of the plurality of grooves.

Preferably, the electrical insulating skeleton includes two symmetrical structures, which are combined into the electrical insulating skeleton through clamping structures that fit each other, thereby tightly surrounding the primary coil.

Preferably, the electrical insulating skeleton is made of plastic or nylon.

Preferably, each of the plurality of grooves is provided with a notch through which the secondary coil may pass to enter the next groove.

Preferably, the transformer is used as a transformer in a circuit for power conversion according to the present disclosure.

The above-described and other advantages of the present disclosure will be made more apparent by the following detailed description of preferred implementations of the present disclosure in conjunction with the drawings.

BRIEF DESCRIPTION OF THE DRAWINGS

In order to further explain the above-described and other advantages and features of the present disclosure, specific implementations of the present disclosure will be described in greater detail below in conjunction with the drawings. The drawings are incorporated in this description together with the following detailed explanations and constitute a part of the description. Components with identical functions and structures are denoted by identical reference signs. It should be understood that these drawings, rather than being construed as limiting the scope of the present disclosure, only illustrate some examples of the present disclosure. In the drawings:

FIG. 10 schematically shows the structure of a transformer according to an implementation of the present disclosure;

DETAILED DESCRIPTION

Figure 1:
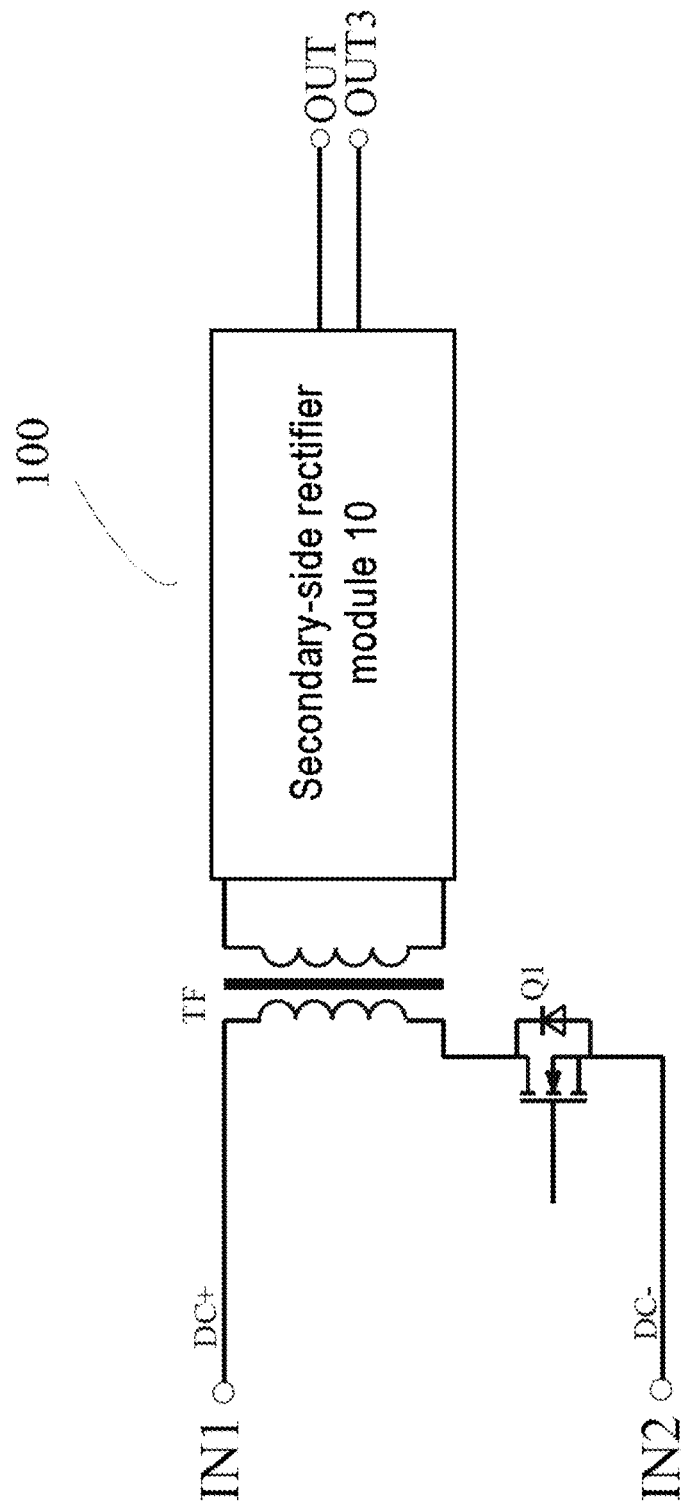
FIG. 1 schematically shows a circuit for power conversion according to an implementation of the present disclosure.

Example implementations of the present disclosure will be described below with reference to the drawings. For the sake of clarity and conciseness, not all features of an actual implementation are detailed in the description. However, it should be understood that many implementation-specific decisions must be made in the development of any such actual implementation in order to achieve a developer's specific goal, for example meeting restrictive conditions related to a system and business, and that these restrictive conditions may vary with implementations. In addition, it should be understood that although development work may be very complex and time-consuming, it is only a routine task for those of ordinary skill in the art who benefit from the present disclosure.

It should also be noted that, in order to prevent unnecessary details from obscuring the present disclosure, only device structures and/or processing steps closely related to a solution according to the present disclosure are shown in the drawings, while other details that bear little relevance to the present disclosure are omitted.

A circuit 100 for power conversion according to an implementation of the present disclosure will be described below in conjunction with FIG. 1.

As shown in FIG. 1, the circuit 100 comprises input terminals IN1 and IN2, a switch Q1, a transformer TF, a secondary-side rectifier module 10, an output terminal OUT, and an output terminal OUT3, wherein the input terminal IN1 receives a positive DC signal DC+, while the input terminal IN2 receives a negative DC signal DC−. The two ends of the primary side of the transformer TF are coupled to the input terminal IN1 and the input terminal IN2, respectively. The switch Q1 is shown as a transistor in the figure, with its drain coupled to one end of the primary side and its source coupled to the input terminal IN2. The secondary-side rectifier module 10 is coupled between the secondary side of the transformer TF and the output terminal OUT, and outputs, at the output terminal OUT, an output signal with superimposed (high-voltage) DC and (high-frequency) AC (e.g., superimposed direct current and alternating current). Thus, a direct current and an alternating current are superimposed onto each other at the output terminal OUT.

It should be pointed out that the DC voltage in the output signal is greater than or equal to 1000 V, preferably at least 5000 V, and more preferably at least 10000 V. Preferably, the DC voltage in the output signal is between 10000 V and 30000 V, for example.

It should also be pointed out that the AC frequency in the output signal is greater than or equal to 10 KHz. Preferably, the AC frequency is between 30 KHz and 200 kHz, preferably at least 50 KHz, and more preferably at least 100 KHz.

It should be understood that the input terminals IN1 and IN2 may be connected to the mains.

It should also be understood that the output terminal OUT3 is coupled to ground, for example.

Figure 2A:
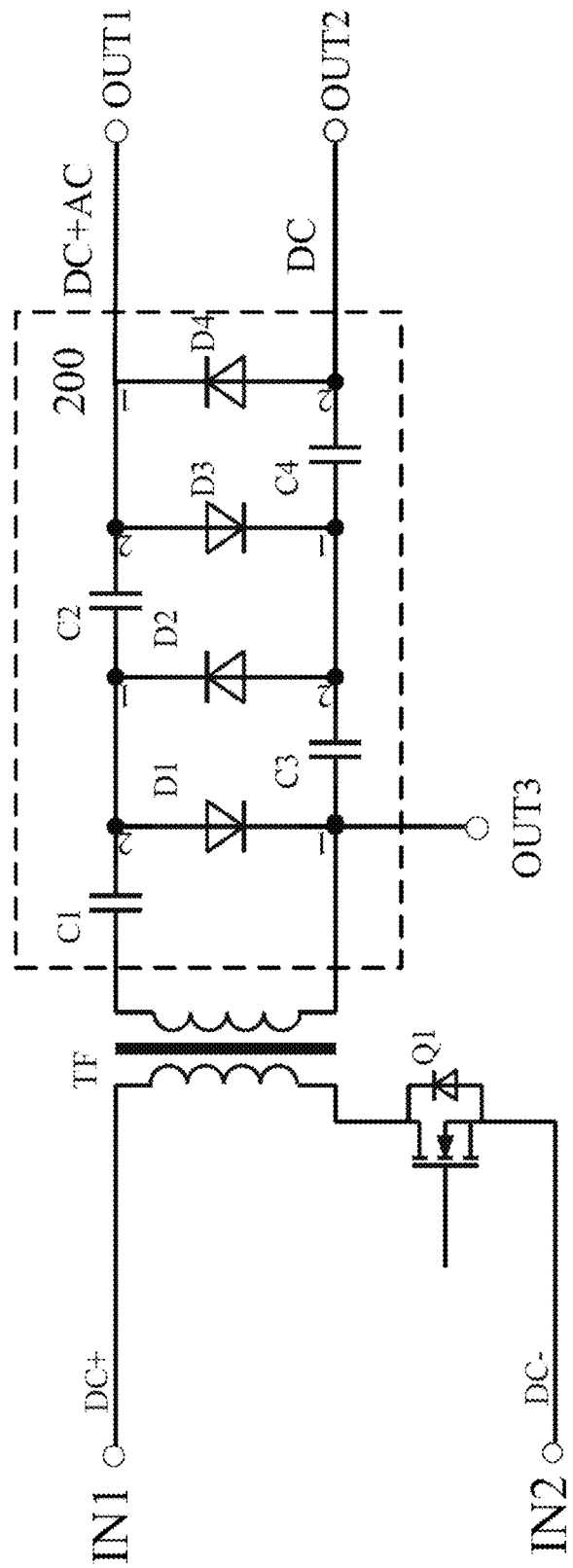
FIG. 2A and FIG. 2B respectively show different implementations of the voltage-doubling rectifier circuit in the circuit shown in FIG. 1.
Figure 2B:
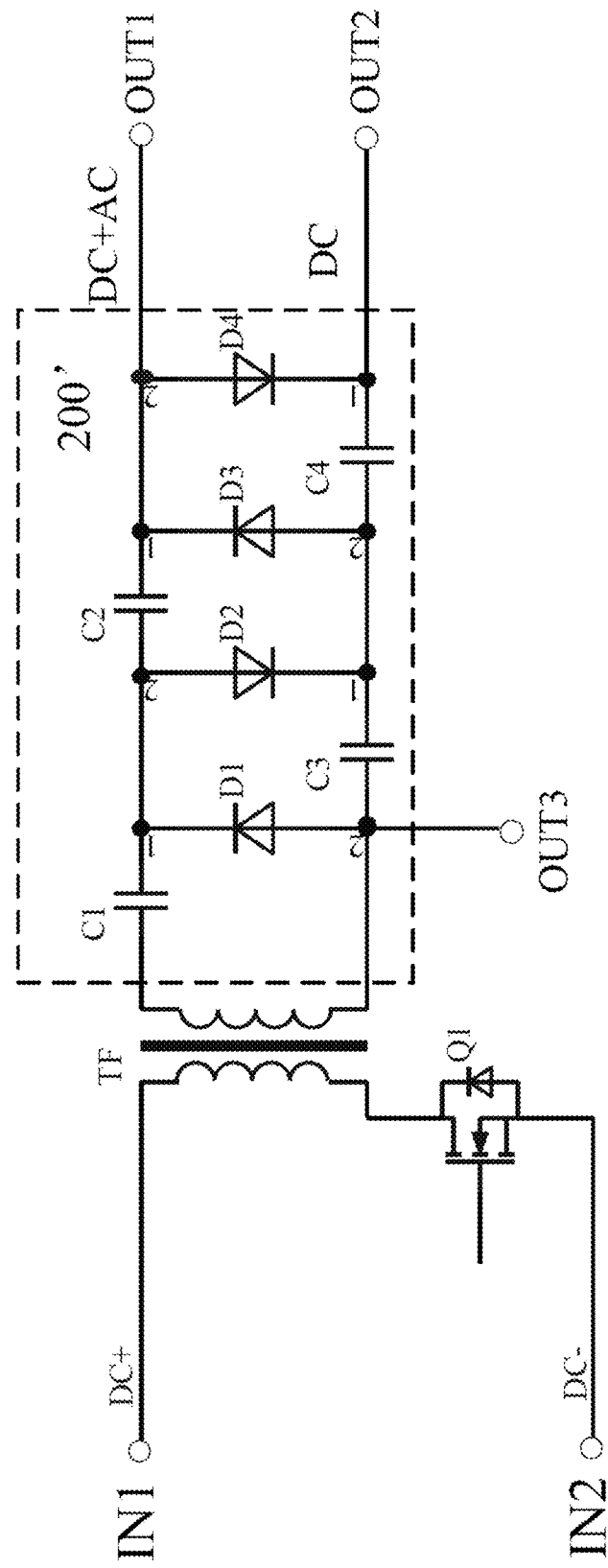

Optionally, although the output terminal OUT is shown as having only one output terminal in FIG. 1, the output terminal OUT may also comprise two output terminals OUT1 and OUT2, as shown in FIG. 2A and FIG. 2B, wherein the output terminal OUT1 can output an output signal with superimposed DC and AC, while the output terminal OUT2 can output an output signal containing DC only. Due to the fact that the present disclosure focuses on only an output signal with superimposed DC and AC, a detailed description of the output terminal OUT2 and an output signal therefrom will be omitted in the following text.

It should be understood that the gate of the transistor Q1 may be coupled to a controller (not shown) to receive a driving signal. The driving signal may be, for example, a PWM (pulse width modulation) or a PFM (pulse frequency modulation) signal. It should be understood that the transistor Q1 enables high-frequency inversion.

It should also be understood that although the transistor Q1 is shown as a metal-oxide-silicon field-effect transistor (MOSFET) in FIG. 1, the present disclosure is not limited thereto and can use any other type of transistor that can achieve the same function, including, but not limited to, a field-effect transistor (FET), a junction field-effect transistor (JFET), a double-gate MOSFET, an insulated gate bipolar transistor (IGBT), etc. Preferably, the transistor Q1 may be a silicon carbide metal-oxide-silicon field-effect transistor (SiC MOSFET).

In this implementation, the secondary-side rectifier module 10 may comprise, for example, a voltage-doubling rectifier circuit. FIG. 2A and FIG. 2B respectively show different implementations of the voltage-doubling rectifier circuit in the circuit shown in FIG. 1.

The voltage-doubling rectifier circuit 200 shown in FIG. 2A comprises a plurality of diodes D1, D2, D3, and D4 alternately connected in series, as well as a plurality of capacitors C1, C2, C3, and C4, and adjacent diodes are coupled between the two ends of the secondary side of the transformer TF in a polarity reversal manner.

As shown in FIG. 2A, one end of the capacitor C1 is coupled to one end of the secondary side of the transformer TF, the anode 2 of the diode D1 is coupled to the other end of the capacitor C1 and the cathode 1 thereof is coupled to the output terminal OUT3 (coupled to ground, for example) and one end of the capacitor C3, and so on, until the last diode D4. The cathode 1 of the diode D4 is coupled to the output terminal OUT1, while the anode 2 thereof is coupled to the output terminal OUT2.

It should be understood that a circuit for power conversion according to the implementation shown in FIG. 2A can provide a negative output signal at the output terminals OUT1 and OUT2.

In the voltage-doubling rectifier circuit 200' shown in FIG. 2B, one end of the capacitor C1 is coupled to one end of the secondary side of the transformer TF, the cathode 1 of the diode D1 is coupled to the other end of the capacitor C1 and the anode 2 thereof is coupled to the output terminal OUT3 (coupled to ground, for example) and one end of the capacitor C3, and so on, until the last diode D4. The anode 2 of the diode D4 is coupled to the output terminal OUT1, while the cathode 1 thereof is coupled to the output terminal OUT2.

It should be understood that a circuit for power conversion according to the implementation shown in FIG. 2B can provide a positive output signal at the output terminals OUT1 and OUT2.

It should also be understood that the AC component in an output signal from the output terminal OUT1 directly reaches the output terminal OUT1 through the capacitors C1 and C2 from the secondary side of the transformer TF.

It should also be understood that the AC frequency in an output signal from the output terminal OUT1 is controlled by setting the frequency of an oscillator in a pulse width modulation (PWM) signal generator (not shown), wherein the gate of the switch Q1 is coupled to the PWM signal generator through a driver (not shown).

It should be pointed out that the grounding of one end of the diode D1 functions as an equipotential connection, further simplifying the insulation design of the entire circuit. In addition, such grounding constitutes a safe output electrode.

In the context of the present disclosure, descriptions will be given below in view of only the voltage-doubling rectifier circuit 200 shown in FIG. 2A. However, the voltage-doubling rectifier circuit 200' shown in FIG. 2B may also be selected as needed.

To make understanding easier, the operating principle of the circuit shown in FIG. 2A will be explained in conjunction with FIG. 3 below. It should be pointed out that FIG. 3 is drawn in the scenario where a circuit for power conversion according to an implementation of the present disclosure is used for the fan system described in conjunction with FIG. 9 below.

Firstly, it should be noted that different gases have different threshold values for electrode discharge voltage under different products of atmospheric pressure multiplied by discharge interval distance. Due to the influence of atmospheric pressure, air humidity, etc., gas discharge threshold varies with environments. Therefore, under the same electrode spacing and gas discharge intensity, it is necessary to adjust the voltage appropriately to achieve a rational gas discharge current strength and generate moderate ozone and ultraviolet radiation. It should be understood that the superimposed high-frequency AC is used for plasma stirring to remove the electrode polarization effect. The higher the discharge voltage is, the higher the AC amplitude will become to ensure sufficient stirring.

Figure 3:
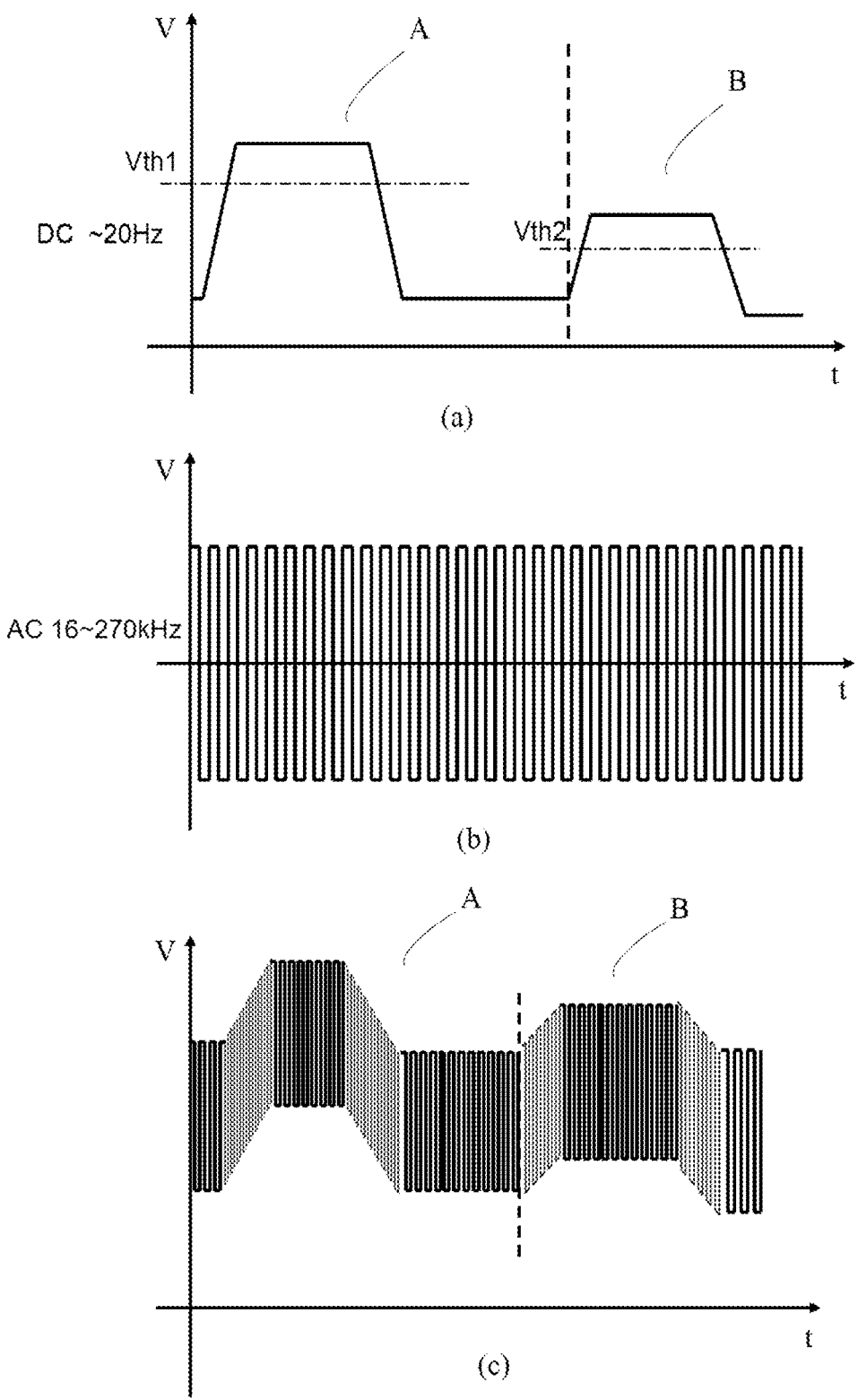
FIG. 3 schematically shows a signal waveform explaining the principle of the circuit shown in FIG. 2A.

The view (a) in FIG. 3 may, for example, be the waveform of a DC signal output by the output terminal OUT2 of the circuit shown in FIG. 2A, with a frequency of approximately 20 Hz.

It should be pointed out that in FIG. 3, the vertical axis represents voltage V, and the horizontal axis represents time t.

It should also be pointed out that the waveform A and the waveform B on either side of the vertical dashed line are different waveforms generated by the circuit in FIG. 2A under different external environmental conditions and parameter settings, wherein Vth1 and Vth2 are the air discharge thresholds of the waveform A and the waveform B, respectively. A DC of any amplitude may be set to PWM low-frequency modulation to meet the optimal discharge requirements under different humidity and atmospheric pressure. The larger the duty cycle of PWM, the greater the air volume output of the fan system. Setting an appropriate power voltage at a time when the PWM corresponding to an increase in air volume is "1" can achieve the best trade-off between the concentration of generated plasma and the released ozone as well as ultraviolet radiation. The time when the PWM is "0" corresponds to a decrease in air volume. It should be understood that in order to avoid acoustic resonance effects, certain frequencies need to be avoided in PWM.

The view (b) of FIG. 3 may be, for example, the waveform of the high-frequency AC driving signal generated by the circuit in FIG. 2A on the secondary side of the transformer TF, with a frequency ranging from 16 to 270 kHz.

It should be understood that the high-frequency AC driving signal is not limited to the shape shown in view (b), but may be any waveform between a square wave and a sine wave.

The view (c) of FIG. 3 may be, for example, the waveform of a signal with superimposed high-frequency AC and high-frequency DC output by the output terminal OUT1 of the circuit shown in FIG. 2A. Similarly, the waveform A and the waveform B on either side of the vertical dashed line in view (c) are different waveforms generated by the circuit of FIG. 2A under different external environmental conditions and parameter settings.

It should be understood that the waveform of view (c) is actually the superimposition of the waveforms of view (a) and view (b).

It should also be understood that although the waveform in view (c) is shown as above 0 V, since the higher the discharge voltage, the larger the AC amplitude and the larger the amplitude of the waveform in view (c), the waveform may also be below 0 V.

Figure 4A:
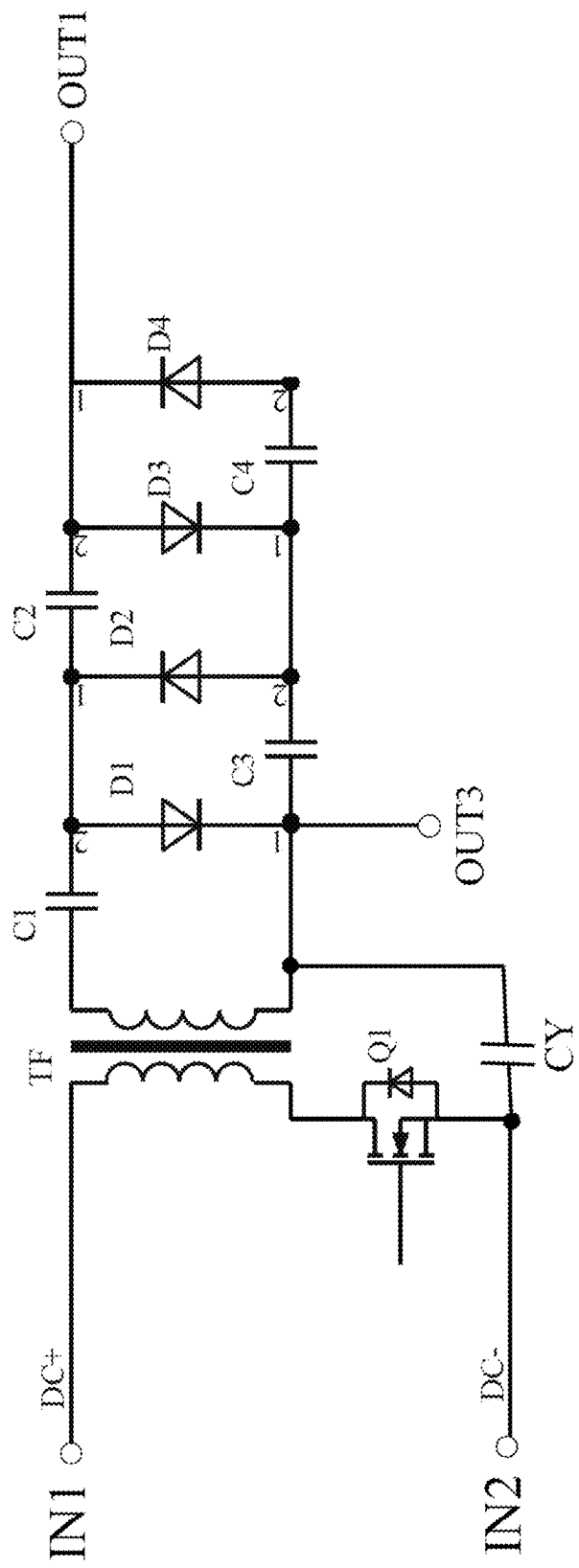
FIG. 4A and FIG. 4B respectively show the detailed structure of a circuit for power conversion according to a preferred implementation of the present disclosure.
Figure 4B:
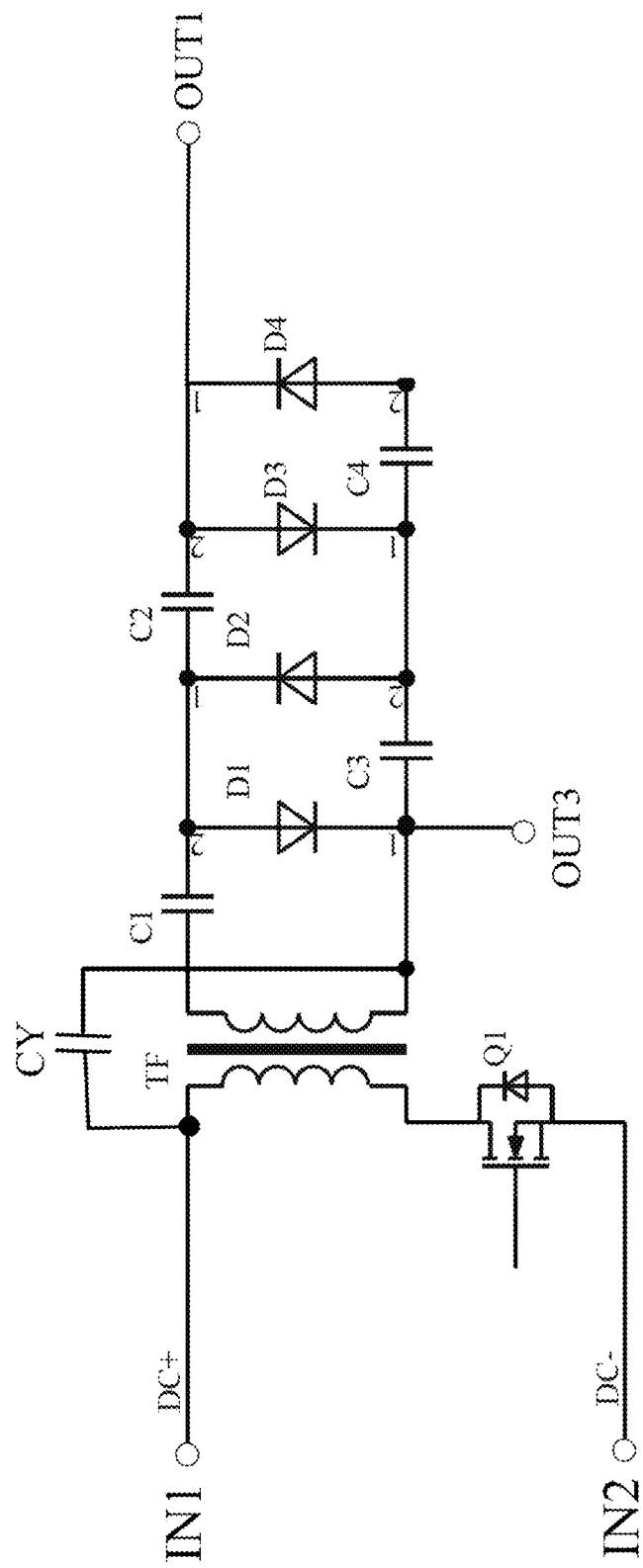

FIG. 4A and FIG. 4B respectively show the detailed structure of a circuit for power conversion according to preferred implementations of the present disclosure. The circuits shown in FIG. 4A and FIG. 4B are different from those shown in FIG. 2A and FIG. 2B in that a capacitor CY is added.

As shown in FIG. 4A, one end of the capacitor CY is coupled to the negative input terminal IN2 and the other end thereof is coupled to the end of the secondary side of the transformer TF that is coupled to the cathode 1 of the diode D1.

As shown in FIG. 4B, one end of the capacitor CY is coupled to the positive input terminal IN1 and the other end thereof is coupled to the end of the secondary side of the transformer TF that is coupled to the cathode 1 of the diode D1.

It should be understood that the different methods of connecting the capacitor CY shown in FIG. 4A and FIG. 4B depend on the electromagnetic compatibility effect measured during the product design phase.

The primary-side coil and secondary-side coil of the transformer TF form capacitance due to their conductivity, thus generating undesired electromagnetic noise. The capacitor CY enables short-circuiting of the electromagnetic noise.

Figure 5A:
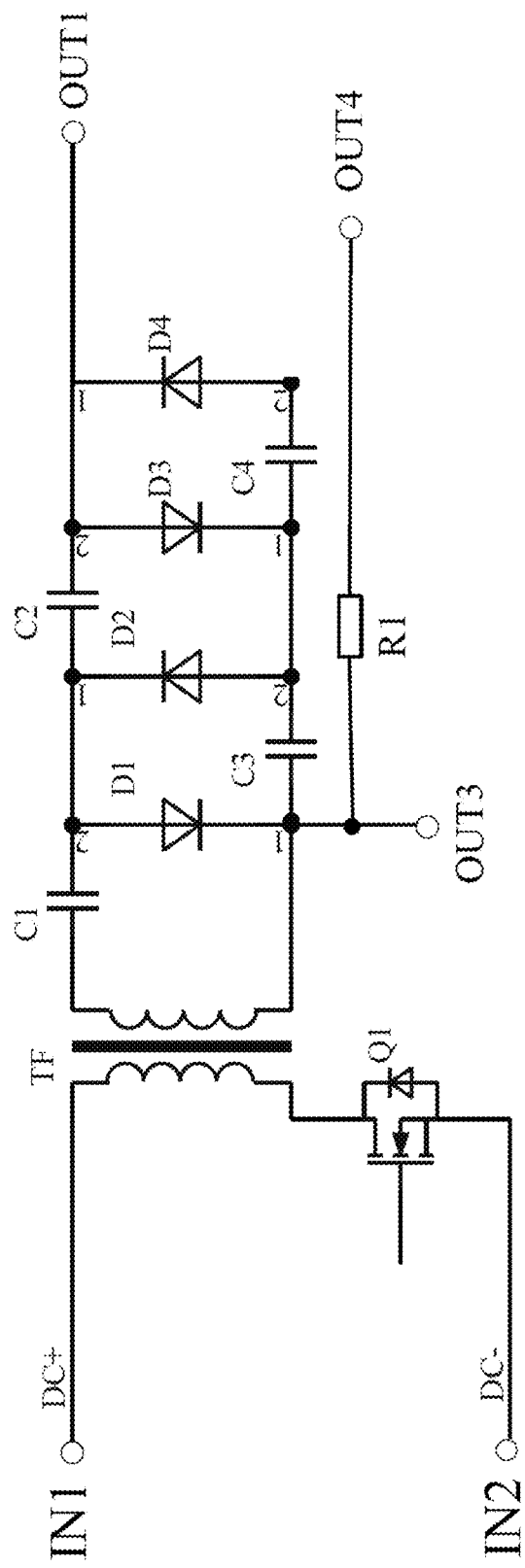
FIG. 5A and FIG. 5B respectively show the detailed structure of a circuit for power conversion according to a preferred implementation of the present disclosure.
Figure 5B:
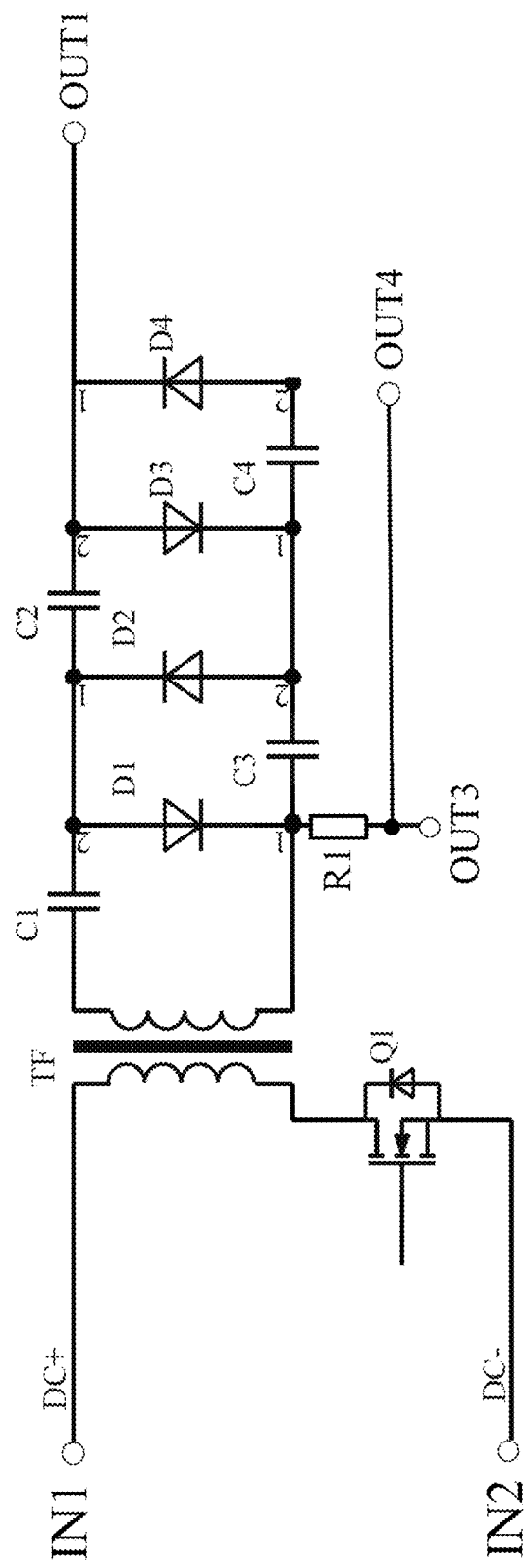

FIG. 5A and FIG. 5B respectively show the detailed structure of a circuit for power conversion according to preferred implementations of the present disclosure. The circuits shown in FIG. 5A and FIG. 5B are different from those shown in FIG. 2A and FIG. 2B in that a current detection module is added, which is exemplified as a resistor R1 in a figure.

As shown in FIG. 5A, one end of the resistor R1 is coupled between the cathode 1 of the diode D1 and ground and the other end thereof is coupled to the output terminal OUT4 of the voltage-doubling rectifier circuit 200, wherein the output terminal OUT4 may be coupled to ground, for example.

As shown in FIG. 5B, one end of the resistor R1 is coupled to the cathode 1 of the diode D1 and the other end thereof is coupled to the output terminal OUT3 (coupled to ground, for example), and the other end thereof coupled to the output terminal OUT3 is further coupled to the output terminal OUT4.

It should be understood that a load short-circuit surge may occur in the circuit, and when the load short-circuit surge causes a resistor in the circuit to exceed its tolerance range, the resistor will become ineffective. Preferably, a surge-resistant resistor may be selected as the resistor R1.

By the resistor R1 as arranged above, current negative feedback is provided to the driver (not shown) of the switch Q1, thereby controlling the on-off time ratio of the switch Q1.

It should be understood that the driver of the switch Q1 is not a part of a circuit for power conversion according to various implementations of the present disclosure, so it will not be described in detail again herein.

Figure 6:
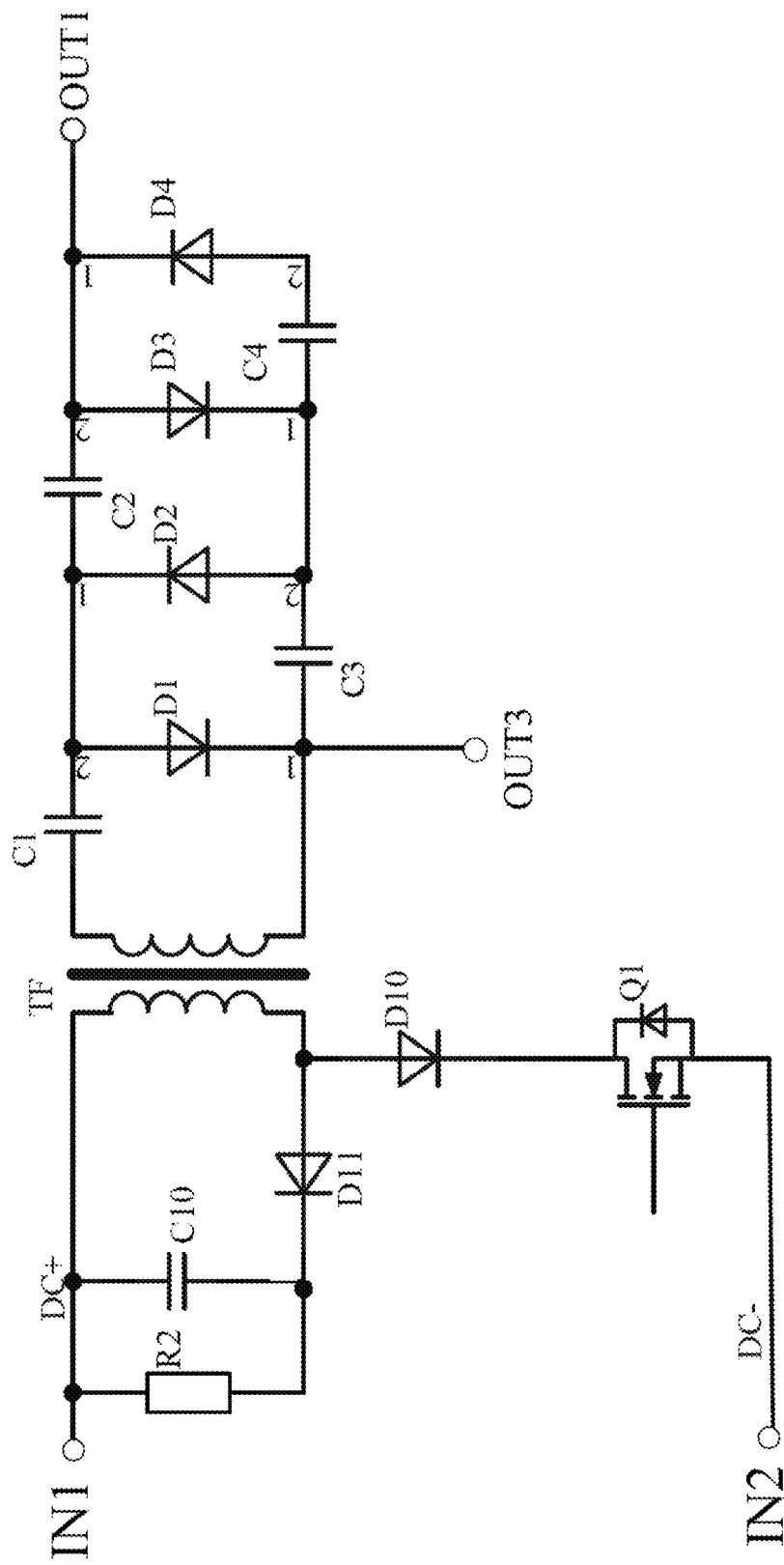
FIG. 6 shows the detailed structure of a circuit for power conversion according to a preferred implementation of the present disclosure.

FIG. 6 shows the detailed structure of a circuit for power conversion according to a preferred implementation of the present disclosure. The difference between the circuit shown in FIG. 6 and those shown in FIG. 2A and FIG. 2B lies in the addition of an RCD absorption circuit coupled at both ends of the primary side of the transformer TF and of a diode D10, wherein the anode of the diode D10 is coupled to one end of the primary side and the cathode thereof is coupled to the drain of the transistor Q1.

The RCD absorption circuit comprises a resistor R2, a capacitor C10, and a diode D11. The anode of the diode D11 is coupled to the anode of the diode D10, and the resistors R2 and C10 are coupled in parallel between the cathode of the diode D11 and the input terminal IN1. It is known that an RCD absorption circuit is used for overvoltage protection.

It should be pointed out that arrangement of the diode D10 prevents the drain-source resistance of especially the transistor Q1, which is a SiC MOSFET, from gradually increasing over time.

Figure 7:
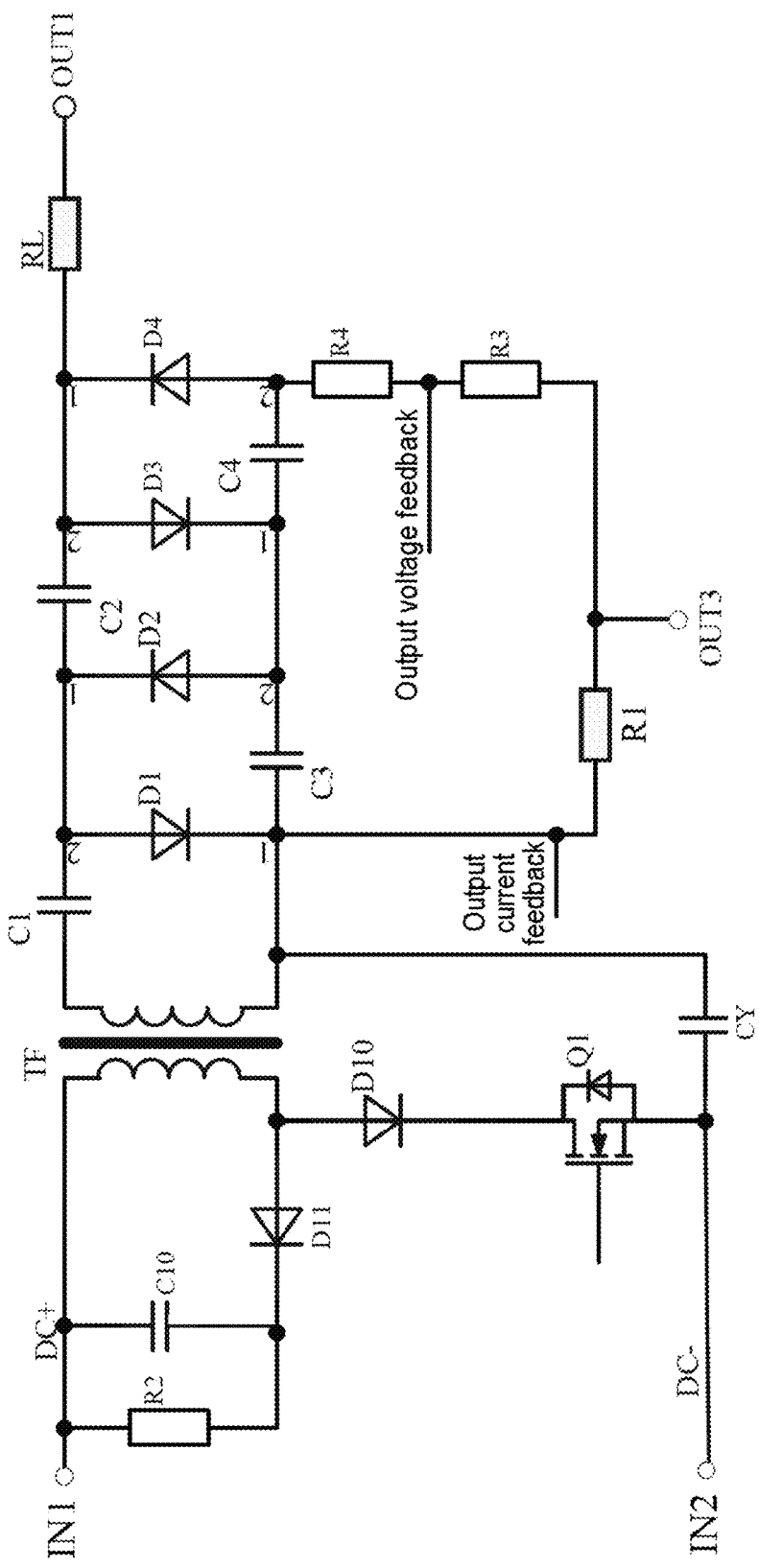
FIG. 7 shows the detailed structure of a circuit for power conversion according to a preferred implementation of the present disclosure.

FIG. 7 shows the detailed structure of a circuit for power conversion according to a preferred implementation of the present disclosure. Compared with the circuit in FIG. 6, the circuit shown in FIG. 7 for power conversion additionally has a current detection module on the secondary side of the transformer TF, a voltage feedback module, a resistor RL coupled between the cathode 1 of the diode D4 and the output terminal OUT1, and a capacitor CY as shown in FIG. 4A.

It should be understood that the resistor RL limits the instantaneous short-circuit current peak of high-voltage capacitors C1 to C4.

In this implementation, the current detection module comprises a resistor R1 coupled between the cathode 1 of the diode D1 and ground. The current at a node between the resistor R1 and the cathode of the diode D1 may be sampled to obtain output current feedback.

The voltage feedback module is exemplified in FIG. 7 as comprising resistors R3 and R4 connected in series, which are coupled between the anode 2 of the diode D4 and ground. The voltage at a node between resistors R3 and R4 may be sampled to obtain output voltage feedback.

Preferably, resistors R3 and R4 may also be surge-resistant resistors, for example.

It should be understood that the voltage feedback module can perform the function of voltage stabilization, and that a voltage sampling signal may be fed back to a suitable controller (not shown) to control the switching of the transistor Q1.

It should also be understood that the method of connecting the capacitor CY in FIG. 7 (as shown in FIG. 4A) is only an example, and the capacitor may also be connected as shown in FIG. 4B.

Figure 8:
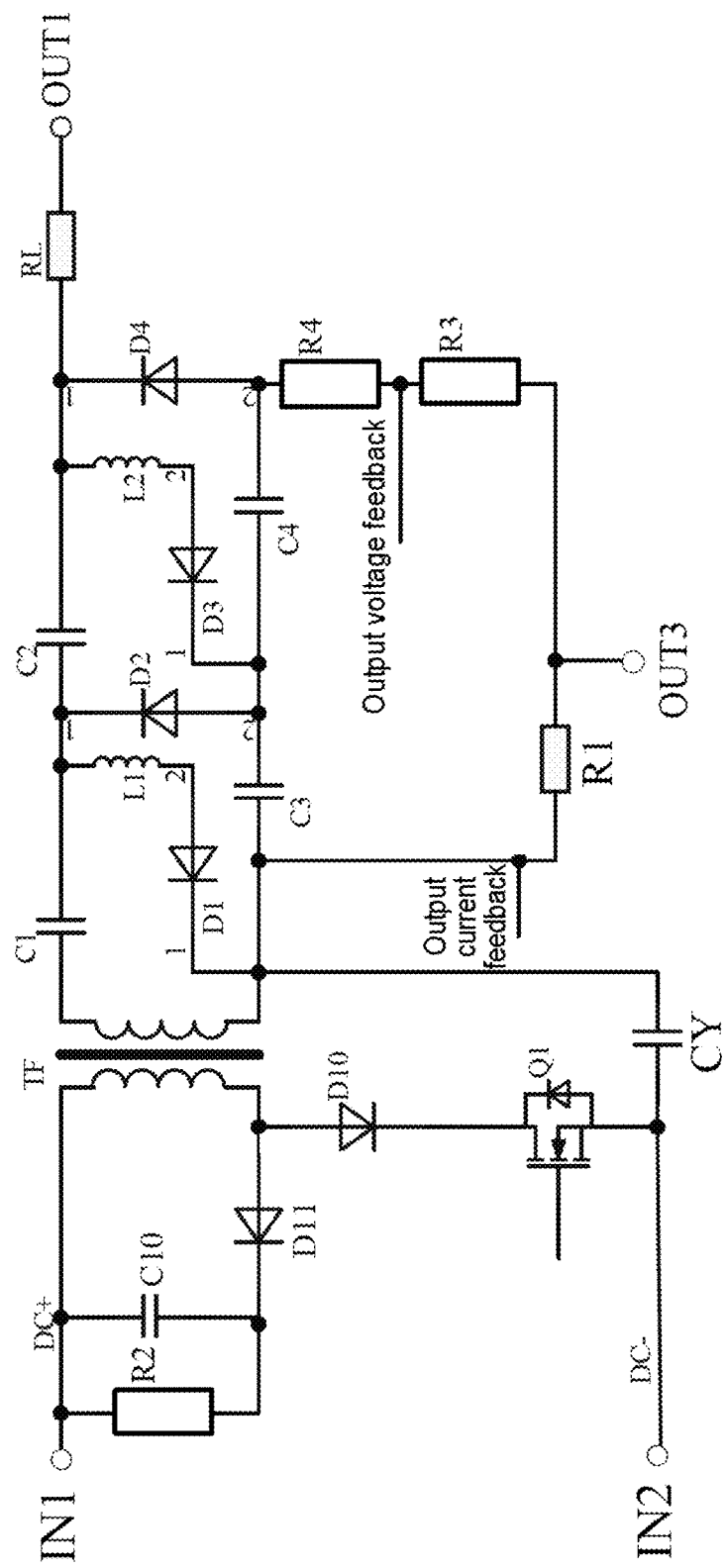
FIG. 8 shows the detailed structure of a circuit for power conversion according to a preferred implementation of the present disclosure.

FIG. 8 shows the detailed structure of a circuit for power conversion according to a preferred implementation of the present disclosure. Compared with the circuit in FIG. 7, the circuit shown in FIG. 8 for power conversion additionally has inductors L1 and L2 in the voltage-doubling rectifier circuit 200 on the secondary side of the transformer TF. As shown in FIG. 8, the inductor L1 is coupled between the capacitor C1 and the anode 2 of the diode D1, and the inductor L2 is coupled between the capacitor C2 and the anode 2 of the diode D3.

It should be pointed out that by arranging the inductors L1 and L2, the surge current in the voltage-doubling rectifier circuit is suppressed and the diode loss is reduced.

A circuit for power conversion described above according to various aspects of the present disclosure requires only one switch Q1, so that the output time of the transformer TF reaches 100% within one cycle and the drain-source current of especially the transistor Q1, which is a SiC MOSFET, is suppressed. Therefore, this circuit is a low-cost, simple, and fast loop.

Figure 9:
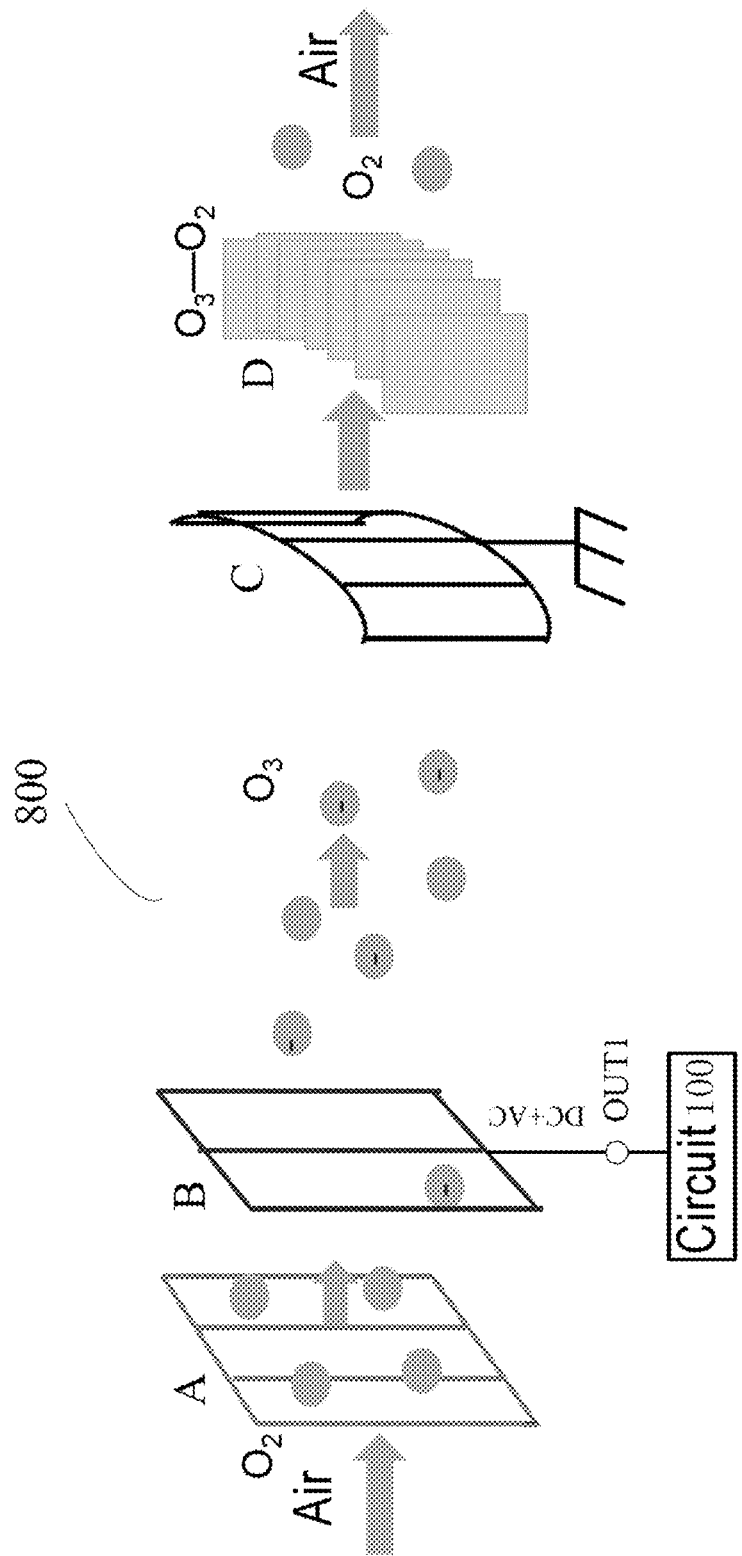
FIG. 9 schematically shows a fan system according to an implementation of the present disclosure.

According to another aspect of the present disclosure, a fan system is further provided. FIG. 9 schematically shows a fan system 800 according to an implementation of the present disclosure, which comprises a gas inlet portion A, a plasma generation device B, a grounding device C, and a gas purifying and reducing portion D.

It should be pointed out that in practice, the fan system 800 further comprises a housing not shown in FIG. 9, which may be made of plastic or resin, for example, and coated with a photocatalyst, for example nano titanium dioxide, on the inner wall to prevent ultraviolet leakage. Preferably, the housing may also enclose a high-voltage power source, for example a circuit for power conversion according to various implementations of the present disclosure.

Usually, the gas inlet portion A comprises a gas inlet filter screen and a grille cavity made of plastic, for example, with the inner wall of the grille cavity coated with a photocatalyst, for example nano titanium dioxide. The gas inlet portion A is used for filtering dust/fibers, blocking ultraviolet rays, guiding airflows, and ensuring safety isolation. Therefore, the gas inlet portion A blocks external objects and internal light (including invisible light such as ultraviolet).

The plasma generation device B is configured to generate plasma and an electric field, for example a DC electric field, for driving plasma to make directional movement, so that the gas introduced from the gas inlet portion A makes directional movement following the plasma. For example, the plasma generation device B may be coupled to the output terminal OUT1 of the circuit 100 for power conversion according to various implementations of the present disclosure, and receive an output signal with superimposed DC and AC from the output terminal OUT1.

It is known that high-voltage electricity may be used to ionize air and generate plasma. Therefore, the air from the gas inlet portion A is ionized in the plasma generation device B under the action of an output signal with superimposed DC and AC from a circuit for power conversion according to various aspects of the present disclosure, and the generated plasma moves toward the grounding device C under the action of a high-voltage DC electric field, forming a wind. Therefore, the plasma generation device B forms an ion acceleration field with the grounding device C, and releases negative ion charges in the air near the electrode. Due to the energy gained by the electrons of the ionized atoms and the subsequent orbital transition, ultraviolet rays and ozone ($O_3$) are produced, which can purify and disinfect air.

It should be pointed out that the grounding device C is coupled to ground, or is connected to common ground with a circuit for power conversion according to various implementations of the present disclosure.

Ozone, harmful to human health, needs to be eliminated from a room or a usage scenario in an enclosed space, for example, a vehicle. For this purpose, the gas purifying and reducing portion D is configured to purify the gas passing through the plasma generation device B to reduce the concentration of ozone ions in the gas. Therefore, the gas purifying and reducing portion D may be made to have a metal or ceramic surface, and comprise a catalyst for eliminating ozone.

It should be pointed out that although the application of circuits for power conversion in fan systems according to various implementations of the present disclosure has been described above, the present disclosure is not limited thereto, but is applicable to other suitable fields, such as induction heating systems.

Figure 11A:
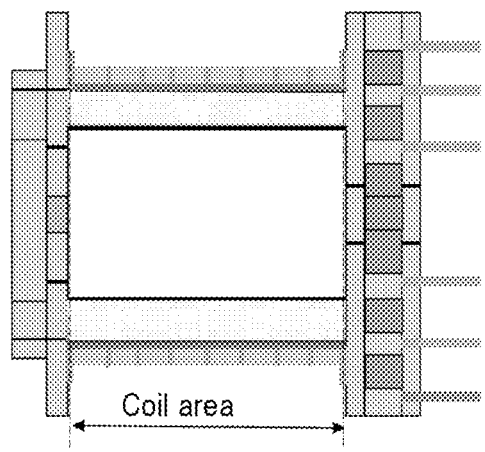
FIG. 11A shows the coil area of the transformer in FIG. 10.
Figure 11B:
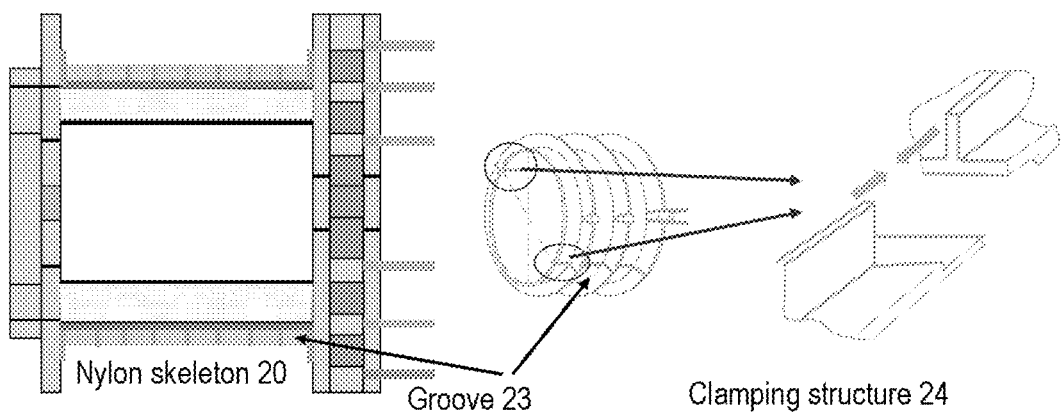
FIG. 11B shows an example configuration of the clamping structure of the transformer in FIG. 10.

According to still another aspect of the present disclosure, a transformer is further provided. FIG. 10 schematically shows a transformer 900 according to an implementation of the present disclosure. FIG. 11A schematically shows the coil area in the transformer 900. FIG. 11B schematically shows the structural details of the transformer 900.

As shown in FIG. 10, the transformer 900 comprises a core 25, a primary coil 21, a secondary coil 22, and an electrical insulating skeleton 20. The primary coil 21 is wound around the core 25. The electrical insulating skeleton 20 may be cylindrical in shape, for example, and has a plurality of grooves 23 in a direction perpendicular to the axis of the core 25, as shown in FIG. 11B. The secondary coils 22 are sequentially wound in series in each of the plurality of grooves 23.

Preferably, 1 to 20 grooves, for example, may be arranged to output voltages in ascending order. Each groove is wound with a plurality of boxes of insulated wires, which are considered as winding groove cakes. A small number of boxes are arranged in each groove, thus generating only a low induced voltage. The groove cakes with small pressure differences are connected in series to output high voltages.

Preferably, the electrical insulating skeleton 20 is made of plastic or nylon and comprises two semi-cylinders, which are combined into the entire cylindrical shape through clamping structures 24 that fit each other, as shown in FIG. 11B, and tightly surround the primary coil 21. It should be pointed out that the skeleton 20 directly contacts the primary coil 21 and can achieve a safe insulation interval of 6 mm from the primary coil to the secondary coil.

It should be understood that the clamping structure 24 is not limited to the two-piece buckle structure shown in FIG. 11B, but may be any structure that can perform the same function.

It should also be understood that skeleton 20 is not limited to a cylindrical shape, but can take any suitable shape, for example, a cube, a sphere, or an elliptical sphere.

It should be pointed out that each of the plurality of the grooves 23 is provided with a notch through which the secondary coil 22 may pass to enter the next groove.

Preferably, the transformer 900 according to the present implementation may be used as a transformer TF in circuits for power conversion according to various implementations of the present disclosure.

The transformer 900 has the advantages of a low cost, a simpler manufacturing process, and a larger coil space, while meeting safety requirements.

It should be pointed out that terms "comprise", "contain", or any variants thereof are intended to cover nonexclusive inclusion, so that a process, method, article, or device that comprises a series of elements not only includes those elements, but also includes other elements that are not expressly listed, or further includes elements that are inherent in such a process, method, article, or device. In addition, without being subject to any further restrictions, an element defined by the statement "comprising one . . . " does not exclude any other identical element in the process, method, article or device comprising the element.

It should also be noted that in a described implementation, any direct electrical connection or coupling between elements, that is, a connection or coupling involving no intermediate elements, is replaceable by an indirect connection or coupling, that is, a connection or coupling involving one or more additional intermediate elements, and vice versa, as long as a general purpose of connection or coupling, for example, providing some signal, some information, or some control, is substantially maintained. In other words, as long as the general purpose and function of a connection or coupling remain substantially unchanged, the connection and coupling may be modified.

Aspects

At least some implementations are defined by the aspects given below.

Aspect 1. A circuit for power conversion, comprising:
a voltage input terminal comprising a positive input terminal and a negative input terminal;
a transformer, a first end of the primary side of the transformer being coupled to the positive input terminal and a second end thereof being coupled to the negative input terminal;
a switch, a first end of which is coupled to the negative input terminal and a second end of which is coupled to the second end of the primary side;
a first output terminal; and
a secondary-side rectifier module coupled between the secondary side of the transformer and the first output terminal, for outputting, at the first output terminal, an output signal with superimposed direct current and alternating current.

Aspect 2. A circuit according to aspect 1, wherein the secondary-side rectifier module comprises a voltage-doubling rectifier circuit composed of a plurality of diodes and a plurality of capacitors to generate an output signal.

Aspect 3. A circuit according to aspect 2, wherein the plurality of capacitors and the plurality of diodes are alternately connected in series to one another, and adjacent diodes are coupled between the two ends of the secondary side in a polarity reversal manner.

Aspect 4. A circuit according to aspect 3, wherein a first end of a first diode among the plurality of diodes is coupled to one end of the secondary side through a first capacitor among the plurality of capacitors, and a second end of the last diode is coupled to the first output terminal.

Aspect 5. A circuit according to aspect 4, wherein a second end of the first diode is coupled to a third output terminal.

Aspect 6. A circuit according to aspect 5, further comprising an additional capacitor, wherein one end of the additional capacitor is coupled to the positive input terminal or the negative input terminal, and the other end thereof is coupled to a second end of the first diode.

Aspect 7. A circuit according to aspect 5, further comprising a current detection module coupled between a second end of the first diode and ground or between a second end of the first diode and the output terminal of the voltage-doubling rectifier circuit.

Aspect 8. A circuit according to aspect 4, further comprising a voltage feedback module coupled between a first end of the last diode and ground.

Aspect 9. A circuit according to aspect 8, wherein the voltage feedback module comprises a second resistor and a third resistor that are coupled in series between the first end of the last diode and ground.

Aspect 10. A circuit according to aspects 1 to 9, wherein the switch is a silicon carbide metal-oxide-silicon field-effect transistor, and
wherein the circuit further comprises an additional diode, the anode of the additional diode being coupled to a second end of the primary side and the cathode thereof being coupled to the drain of the silicon carbide metal-oxide-silicon field-effect transistor.

Aspect 11. A circuit according to any one of aspects 1 to 9, further comprising an RCD absorption circuit on the primary side.

Aspect 12. A circuit according to aspect 4, further comprising a fourth resistor coupled between the second end of the last diode and the first output terminal.

Aspect 13. A circuit according to any one of aspects 2 to 9, wherein the voltage-doubling rectifier circuit further comprises a plurality of inductors, each of the inductors being coupled between a corresponding capacitor and diode in the voltage-doubling rectifier circuit by being spaced with a group of capacitors and diodes.

Aspect 14. A circuit according to any one of aspects 2 to 9, wherein a first end of the diode is an anode and a second end thereof is a cathode, and wherein the circuit outputs, at the first output terminal, an output signal with superimposed negative direct current and alternating current.

Aspect 15. A circuit according to any one of aspects 2 to 9, wherein a first end of the diode is a cathode and a second end thereof is an anode, and wherein the circuit outputs, at the first output terminal, an output signal with superimposed positive direct current and alternating current.

Aspect 16. A circuit according to aspect 1, wherein the direct current has a voltage greater than 1000 volts, and the alternating current has a frequency greater than 10 KHz.

Aspect 17. A circuit according to any one of aspects 4 to 9, further comprising a second output terminal coupled to a first end of the last diode, wherein the secondary-side rectifier module outputs, at the second output terminal, another output signal consisting only of the direct current among the direct current and alternating current output from the first output terminal.

Aspect 18. A fan system, comprising:
a gas inlet portion configured to introduce an external gas;
a plasma generation device configured to generate plasma and an electric field for driving plasma to make a directional movement, such that the gas introduced from the gas inlet portion makes a directional movement following the plasma, wherein the plasma generation device is driven by a circuit according to any one of aspects 1 to 17, or receives an output signal with superimposed direct current and alternating current output by a circuit according to any one of aspects 1 to 17; and
a gas purifying unit configured to purify the gas passing through the plasma generation device to reduce the concentration of ozone ions in the gas.

Aspect 19. A fan system according to aspect 18, wherein the gas inlet portion comprises a gas inlet screen and a grille cavity, with the inner wall of the grille cavity coated with a photocatalyst.

Aspect 20. A fan system according to aspect 18 or 19, wherein the gas purifying unit has a metal or ceramic surface and comprises a catalyst for purifying gas, and wherein the catalyst is a catalyst for eliminating ozone.

Aspect 21. A transformer, comprising:
a core;
a primary coil wound around the core;
an electrical insulating skeleton provided with a plurality of grooves in a direction perpendicular to the axis of the core; and
secondary coils sequentially wound in series in each of the plurality of grooves.

Aspect 22. A transformer according to aspect 21, the electrical insulating skeleton comprising two symmetrical structures, which are combined into the electrical insulating skeleton through clamping structures that fit each other, thereby tightly surrounding the primary coil.

Aspect 23. A transformer according to aspect 21 or 22, wherein the electrical insulating skeleton is made of plastic or nylon.

Aspect 24. A transformer according to aspect 21 or 22, wherein each of the plurality of grooves is provided with a notch through which the secondary coil may pass to enter the next groove.

Aspect 25. A transformer according to aspect 21 or 22, wherein the transformer is used as a transformer in a circuit according to any one of aspects 1 to 17.

Aspect 26: A circuit for power conversion, comprising: a voltage input terminal comprising a positive input terminal and a negative input terminal; a transformer comprising a primary side and a secondary side, wherein a first end of the primary side is coupled to the positive input terminal and a second end of the primary side being coupled to the negative input terminal; a switch having a first end and a second end, wherein the first end of the switch is coupled to the negative input terminal and the second end of the switch is coupled to the second end of the primary side; a first output terminal; and a secondary-side rectifier module coupled between the secondary side of the transformer and the first output terminal, wherein the secondary-side rectifier module is configured to output, at the first output terminal, an output signal with superimposed direct current and alternating current.

Aspect 27: The circuit as recited in Aspect 26, wherein the secondary-side rectifier module comprises a voltage-doubling rectifier circuit comprising a plurality of diodes and a plurality of capacitors for generating the output signal.

Aspect 28: The circuit as recited in Aspect 27, wherein the plurality of capacitors and the plurality of diodes are alternately connected in series to one another, and adjacent diodes of the plurality of diodes are coupled between two ends of the secondary side in a polarity reversal manner.

Aspect 29: The circuit as recited in Aspect 28, wherein a first end of a first diode of the plurality of diodes is coupled to a first end of the secondary side through a first capacitor of the plurality of capacitors, and a second end of a last diode of the plurality of diodes is coupled to the first output terminal.

Aspect 30: The circuit as recited in Aspect 29, wherein a second end of the first diode is coupled to a third output terminal.

Aspect 31: The circuit as recited in Aspect 30, further comprising: an additional capacitor, wherein a first end of the additional capacitor is coupled to the positive input terminal or the negative input terminal, and a second end of the additional capacitor is coupled to a second end of the first diode.

Aspect 32: The circuit as recited in Aspect 30, further comprising: a current detection module coupled between a second end of the first diode and ground or between the second end of the first diode and an output terminal of the voltage-doubling rectifier circuit.

Aspect 33: The circuit as recited in Aspect 29, further comprising: a voltage feedback module coupled between a first end of the last diode and ground.

Aspect 34: The circuit as claimed in any of Aspects 26-33, wherein the switch is a silicon carbide metal-oxide-silicon field-effect transistor, and wherein the circuit further comprises an additional diode, wherein an anode of the additional diode is coupled to the second end of the primary side, and a cathode of the additional diode is coupled to a drain of the silicon carbide metal-oxide-silicon field-effect transistor.

Aspect 35: The circuit as claimed in any of Aspects 26-34, further comprising: a resistor-capacitor-diode (RCD) absorption circuit on the primary side.

Aspect 36: The circuit as recited in Aspect 27, wherein the voltage-doubling rectifier circuit further comprises a plurality of inductors, each of the plurality of inductors being coupled between a corresponding capacitor and a corresponding diode in the voltage-doubling rectifier circuit by being spaced with a group of capacitors and diodes.

Aspect 37: The circuit as recited in Aspect 29, wherein the first end of the first diode is an anode and the second end of the last diode is a cathode, and wherein the circuit is configured to output, at the first output terminal, an output signal with superimposed negative direct current and alternating current.

Aspect 38: The circuit as recited in Aspect 29, wherein the first end of the first diode is a cathode and the second end of the last diode is an anode, and wherein the circuit is configured to output, at the first output terminal, an output signal with superimposed positive direct current and alternating current.

Aspect 39: The circuit as claimed in any of Aspects 26-38, wherein the direct current has a voltage greater than 1000 volts, and the alternating current has a frequency greater than 10 KHz.

Aspect 40: The circuit as recited in Aspect 29, further comprising: a second output terminal, wherein the second output terminal is coupled to a first end of the last diode, wherein the secondary-side rectifier module is configured to output, at the second output terminal, another output signal comprising only the direct current among the direct current and the alternating current output from the first output terminal.

Aspect 41: The circuit as claimed in any of Aspects 26-40, wherein the transformer comprises: a core; a primary coil wound around the core; an electrical insulating skeleton provided with a plurality of grooves in a direction perpendicular to an axis of the core; and secondary coils sequentially wound in series in each of the plurality of grooves.

Aspect 42: A fan system, comprising: a gas inlet portion configured to introduce an external gas; a plasma generation device, which is configured to generate plasma and an electric field for driving the plasma to make a directional movement, such that the external gas introduced from the gas inlet portion makes a directional movement following the plasma, wherein the plasma generation device is configured to be driven by a circuit, or the plasma generation device is configured to receive an output signal with superimposed direct current and alternating current output by the circuit; and a gas purifying unit, which is configured to purify the external gas passing through the plasma generation device to reduce a concentration of ozone ions in the external gas.

Aspect 43: The fan system as recited in Aspect 42, wherein the gas purifying unit has a metal surface or a ceramic surface, wherein the gas purifying unit comprises a catalyst for purifying the external gas, and wherein the catalyst is a catalyst for eliminating ozone.

Aspect 44: The fan system as claimed in any of Aspects 42-43, wherein the circuit comprises: a voltage input terminal comprising a positive input terminal and a negative input terminal; a transformer comprising a primary side and a secondary side, wherein a first end of the primary side is coupled to the positive input terminal and a second end of the primary side being coupled to the negative input terminal; a switch having a first end and a second end, wherein the first end of the switch is coupled to the negative input terminal and the second end of the switch is coupled to the second end of the primary side; a first output terminal; and a secondary-side rectifier module coupled between the secondary side of the transformer and the first output terminal, wherein the secondary-side rectifier module is configured to output, at the first output terminal, the output signal with the superimposed direct current and alternating current Aspect 45: A transformer, comprising: a core; a primary coil wound around the core; an electrical insulating skeleton provided with a plurality of grooves in a direction perpendicular to an axis of the core; and secondary coils sequentially wound in series in each of the plurality of grooves.

Aspect 46: The transformer as recited in Aspect 45, wherein the electrical insulating skeleton comprises two symmetrical structures, which are combined to form the electrical insulating skeleton through clamping structures that mate with each other, thereby tightly surrounding the primary coil.

Aspect 47: The transformer as claimed in any of Aspects 45-46, wherein the electrical insulating skeleton is made of plastic or nylon.

Aspect 48: The transformer as claimed in any of Aspects 45-47, wherein each of the plurality of grooves is provided with a notch through which a secondary coil may pass to enter a next groove.

Aspect 49: A system configured to perform one or more operations recited in one or more of Aspects 1-48.

Aspect 50: An apparatus comprising means for performing one or more operations recited in one or more of Aspects 1-48.

While implementations of the present disclosure have been described in detail above with reference to the drawings, it should be understood that the implementations described above are only configured to explain the present disclosure, rather than constituting a limitation on the present disclosure. Those of ordinary skill in the art may make various modifications and alterations to the above-described implementations without departing from the spirit or scope of the present disclosure. Therefore, the scope of the present disclosure is defined only by the appended claims and meanings equivalent thereto.

The invention claimed is:

1. A circuit for power conversion, comprising:
    a voltage input terminal comprising a positive input terminal and a negative input terminal;
    a transformer comprising a primary side and a secondary side, wherein a first end of the primary side is coupled to the positive input terminal and a second end of the primary side being coupled to the negative input terminal;
    a switch having a first end and a second end, wherein the first end of the switch is coupled to the negative input terminal and the second end of the switch is coupled to the second end of the primary side;
    a first output terminal; and
    a secondary-side rectifier module coupled between the secondary side of the transformer and the first output terminal, wherein the secondary-side rectifier module is configured to output, at the first output terminal, an output signal with superimposed direct current and alternating current.

2. The circuit as claimed in claim 1, wherein the secondary-side rectifier module comprises a voltage-doubling rectifier circuit comprising a plurality of diodes and a plurality of capacitors for generating the output signal.

3. The circuit as claimed in claim 2, wherein the plurality of capacitors and the plurality of diodes are alternately connected in series to one another, and adjacent diodes of the plurality of diodes are coupled between two ends of the secondary side in a polarity reversal manner.

4. The circuit as claimed in claim 3, wherein a first end of a first diode of the plurality of diodes is coupled to a first end of the secondary side through a first capacitor of the plurality of capacitors, and a second end of a last diode of the plurality of diodes is coupled to the first output terminal.

5. The circuit as claimed in claim 4, wherein a second end of the first diode is coupled to a third output terminal.

6. The circuit as claimed in claim 5, further comprising:
    an additional capacitor, wherein a first end of the additional capacitor is coupled to the positive input terminal or the negative input terminal, and a second end of the additional capacitor is coupled to a second end of the first diode.

7. The circuit as claimed in claim 2, wherein the voltage-doubling rectifier circuit further comprises a plurality of inductors, each of the plurality of inductors being coupled between a corresponding capacitor and a corresponding diode in the voltage-doubling rectifier circuit by being spaced with a group of capacitors and diodes.

8. The circuit as claimed in claim 4, further comprising:
    a voltage feedback module coupled between a first end of the last diode and ground.

9. The circuit as claimed in claim 4, wherein the first end of the first diode is an anode and the second end of the last diode is a cathode, and wherein the circuit is configured to output, at the first output terminal, an output signal with superimposed negative direct current and alternating current.

10. The circuit as claimed in claim 4, wherein the first end of the first diode is a cathode and the second end of the last diode is an anode, and wherein the circuit is configured to output, at the first output terminal, an output signal with superimposed positive direct current and alternating current.

11. The circuit as claimed in claim 4, further comprising:
a second output terminal, wherein the second output terminal is coupled to a first end of the last diode, wherein the secondary-side rectifier module is configured to output, at the second output terminal, another output signal comprising only the direct current among the direct current and the alternating current output from the first output terminal.

12. The circuit as claimed in claim 5, further comprising:
a current detection module coupled between a second end of the first diode and ground or between the second end of the first diode and an output terminal of the voltage-doubling rectifier circuit.

13. The circuit as claimed in claim 1, wherein the switch is a silicon carbide metal-oxide-silicon field-effect transistor, and
wherein the circuit further comprises an additional diode, wherein an anode of the additional diode is coupled to the second end of the primary side, and a cathode of the additional diode is coupled to a drain of the silicon carbide metal-oxide-silicon field-effect transistor.

14. The circuit as claimed in claim 1, further comprising:
a resistor-capacitor-diode (RCD) absorption circuit on the primary side.

15. The circuit as claimed in claim 1, wherein the direct current has a voltage greater than 1000 volts, and the alternating current has a frequency greater than 10 KHz.

16. The circuit as claimed in claim 1, wherein the transformer comprises:
a core;
a primary coil wound around the core;
an electrical insulating skeleton provided with a plurality of grooves in a direction perpendicular to an axis of the core; and
secondary coils sequentially wound in series in each of the plurality of grooves.

17. A fan system, comprising:
a gas inlet portion configured to introduce an external gas;
a plasma generation device, which is configured to generate plasma and an electric field for driving the plasma to make a directional movement, such that the external gas introduced from the gas inlet portion makes a directional movement following the plasma, wherein the plasma generation device is configured to be driven by a circuit, or the plasma generation device is configured to receive an output signal with superimposed direct current and alternating current output by the circuit; and
a gas purifying unit, which is configured to purify the external gas passing through the plasma generation device to reduce a concentration of ozone ions in the external gas.

18. The fan system as claimed in claim 17, wherein the gas purifying unit has a metal surface or a ceramic surface, wherein the gas purifying unit comprises a catalyst for purifying the external gas, and wherein the catalyst is a catalyst for eliminating ozone.

19. The fan system as claimed in claim 17, wherein the circuit comprises:
a voltage input terminal comprising a positive input terminal and a negative input terminal;
a transformer comprising a primary side and a secondary side, wherein a first end of the primary side is coupled to the positive input terminal and a second end of the primary side being coupled to the negative input terminal;
a switch having a first end and a second end, wherein the first end of the switch is coupled to the negative input terminal and the second end of the switch is coupled to the second end of the primary side;
a first output terminal; and
a secondary-side rectifier module coupled between the secondary side of the transformer and the first output terminal, wherein the secondary-side rectifier module is configured to output, at the first output terminal, the output signal with the superimposed direct current and alternating current.

20. A transformer, comprising:
a core;
a primary coil wound around the core;
an electrical insulating skeleton provided with a plurality of grooves in a direction perpendicular to an axis of the core; and
secondary coils sequentially wound in series in each of the plurality of grooves.

21. The transformer as claimed in claim 20, wherein the electrical insulating skeleton comprises two symmetrical structures, which are combined to form the electrical insulating skeleton through clamping structures that mate with each other, thereby tightly surrounding the primary coil.

22. The transformer as claimed in claim 20, wherein the electrical insulating skeleton is made of plastic or nylon.

23. The transformer as claimed in claim 20, wherein each of the plurality of grooves is provided with a notch through which a secondary coil may pass to enter a next groove.

* * * * *